United States Patent [19]
Friedrich

[11] Patent Number: 4,574,896
[45] Date of Patent: Mar. 11, 1986

[54] MEASURING DEVICE FOR THE CONTINUOUS WEIGHT DETERMINATION OF MATERIAL STREAMS

[76] Inventor: Claus Friedrich, Holzmühle, D-6304 Lollar, Fed. Rep. of Germany

[21] Appl. No.: 684,067

[22] Filed: Dec. 20, 1984

[30] Foreign Application Priority Data

Dec. 21, 1983 [DE] Fed. Rep. of Germany ....... 3346145

[51] Int. Cl.⁴ .................. G01G 11/14; G01G 19/52
[52] U.S. Cl. ......................................... 177/16; 177/50
[58] Field of Search .................. 177/16, 50; 222/410

[56] References Cited

U.S. PATENT DOCUMENTS

| | | | |
|---|---|---|---|
| 2,468,712 | 4/1949 | Kohler | 222/410 X |
| 4,111,272 | 9/1978 | Ricciardi et al. | 177/50 |
| 4,386,719 | 6/1983 | Serizawa | 222/410 X |
| 4,513,830 | 4/1985 | Persbeck et al. | 177/16 X |
| 4,513,892 | 4/1985 | Koeneman et al. | 222/410 X |

*Primary Examiner*—George H. Miller, Jr.
*Attorney, Agent, or Firm*—Keil & Weinkauf

[57] ABSTRACT

The continuous determination of the weight of a material stream by means of the blow force occurring on a bouncing plate, as used for many applications, is not sufficiently exact. For the determination of the driving torque a rotating impeller wheel which conveys the material stream and is driven at a constant speed of rotation is being proposed, the material stream being supplied to the impeller wheel in the central range thereof and is radially supplied to the guide vanes which lie outside of the central supply range.

12 Claims, 3 Drawing Figures

MEASURING DEVICE FOR THE CONTINUOUS WEIGHT DETERMINATION OF MATERIAL STREAMS

FIELD OF THE INVENTION

The invention relates to a measuring device for the continuous weight determination of material streams particularly of loose or pourable material as, for example, granular food or the grinding products thereof.

BACKGROUND OF THE INVENTION AND PRIOR ART

For the exact weight determination of material streams as it is required for many loose materials, it is customary to successively fill, weigh and again empty a weighing vessel. This method has the disadvantage that the continuous material stream is continuously interrupted and that in addition it is mechanically costly.

For the continuous weight determination of material streams, in practice only conveyor belt scales are used by means of which the weight of a conveyor belt charged with loose material is continuously measured. In many processes this method is not usable because on the one hand it is fairly expensive and on the other hand it is very difficult to design it in a dust-proof manner.

A known method for the continuous volume measurement of pourable solids consists in dropping the delivered material from a predetermined height onto a bouncing plate and to measure the force of blow on the bounce plate. Provided that uniform conditions can be maintained, the force of blow is proportional to the conveying strength. It is not possible to maintain the measuring conditions such as the height of the drop, the friction between the loose material and the bouncing plate so uniform that sufficient accuracy can be obtained. Particularly in the lower measuring range, measuring errors occur due to air turbulence which make this method unusable for higher requirements in regard to the measuring accuracy, as they apply to the determination of weight.

For the determination of the mass or the volume of pneumatically supplied loose material in the iron industry, such as lime dust or fine ore, according to German Laid-Open application DE-OS No. 2,544,976 the effective inertial force (Coriolis force), which is produced in coupling a moving mass particle with a rotating reference body is used for the mass determination. In this method the material stream is made to impinge in axial parallel relationship on practically the entire surface of a disk provided with radial guide vanes, whereupon the loose material is flung off substantially perpendicularly to the rotational axis of the disk. The torque of the disk rotating at a constant rotational velocity varies in accordance with the Coriolis force, the variation of the torque being roughly proportional to the mass of the flowing material to be measured. With this variation of the torque the power consumption of the electro motor driving the disk varies; for this reason the current consumption of the electro motor can be measured and be used as a measure for the determination of the mass stream. For application in the iron industry for the determination of the charge volume the device described in DE-OS No. 2,544,976 may be sufficient, however for the exact determination of the flow of a pure loose material stream as for example granular food, this device is too inexact. The supply of the loose material perpendicularly to practically the entire guide vane surface of the rotating disk leads to uncontrollable bouncing off effects upon contact with the guide vanes so that the measuring accuracy is adversely affected. Depending on the location on the disk radius at which the mass particles impinge, the acceleration distance through the guide vanes is of a different length; different friction effects between the mass particles and the guide vanes also enter the measuring result. In addition the power consumption measurement of the electro motor is relatively inaccurate, because of its non-linear efficiency characteristic and the varying bearing friction.

OBJECT AND SUMMARY OF THE INVENTION

The problem underlying the invention is to provide a measuring device which measures the torque variations occurring in the acceleration of the material in such a way that a continuous weight determination with high accuracy is attained. In this connection it is essential that the individual mass particles are subjected to acceleration conditions which are as uniform as possible and that all side effects affecting the driving torque are eliminated.

This problem is solved primarily by means of a measuring device for the continuous weight determination of material streams, particularly of loose material such as granular food or the grinding products thereof, consisting of an impeller wheel driven by a motor at a constant rotational velocity to which wheel the material stream is supplied, in its axial range by way of a charging device, and by the guide vanes of which the material stream is accelerated, the occurring variation of the driving torque being used as a measure for the determination of the flowthrough volume, wherein the guide vanes of the impeller wheel which extend from the outer perimeter to the center terminate before the axial supply range.

The design of the impeller wheel according to the invention insures that the material stream is supplied to the central range of the impeller wheel and, subsequently, radially to the guide vanes without disturbing bouncing effects. Between the guide vanes each mass particle is subjected to the same acceleration conditions so that the mass of the entire stream is very precisely determined by the variation of the driving torque. The acceleration distance is of equal length for each mass particle. This is accomplished by means of the fact that the central supply range of the impeller wheel is provided with a guiding device which deflects the material stream radially in the direction of the guide vanes. Preferably the guiding device is made of cone shape, with the tip of the cone being oriented against the material stream. However it is also sufficient if the guiding device is formed as a bouncing surface on which then a cone is formed of the loose material.

From the guiding device the material stream arrives at a bounding range on the impeller wheel housing, which is formed opposite the flinging off range of the impeller wheel as a bouncing range extending at an angle to the impeller wheel axis.

This bouncing range preferably extends at an angle of 45° to the axis of the impeller wheel. The supply device preferably consists of a supply funnel extending all the way into the central supply range, a lock being provided ahead of the funnel.

For the lock a line wheel lock or a worm tube is preferably used. If no lock is present, the air current which is also drawn in could lead to an adulteration of the measuring result. In this case it is advantageous if a feedback line leading from the discharge space of the impeller wheel housing to the supply range of the material stream is provided.

The motor for the drive of the impeller wheel preferably is supported for rocking movement and is connected with a torque measuring device.

As the torque measuring device an energy storage element extending in the axial direction of the motor for the drive of the impeller wheel is used, the storage device being connected with the motor housing by way of a linkage. Associated with the energy storage device are an indicating instrument of conventional design calibrated in accordance with the volume stream per unit of time, and a conventional, known total volume counter.

Preferred embodiments of the invention will be described hereafter in further detail with reference to the accompanying drawings in which FIG. 1 is an elevation, in cross-section, of an embodiment of the invention;

FIG. 2 is a graph used as a basis for the mathematical analysis of the invention carried out hereinbelow; and FIG. 3 illustrates a modified embodiment of the invention.

DETAILED DESCRIPTION OF THE PREFERRED EMBODIMENTS

Figure 2:
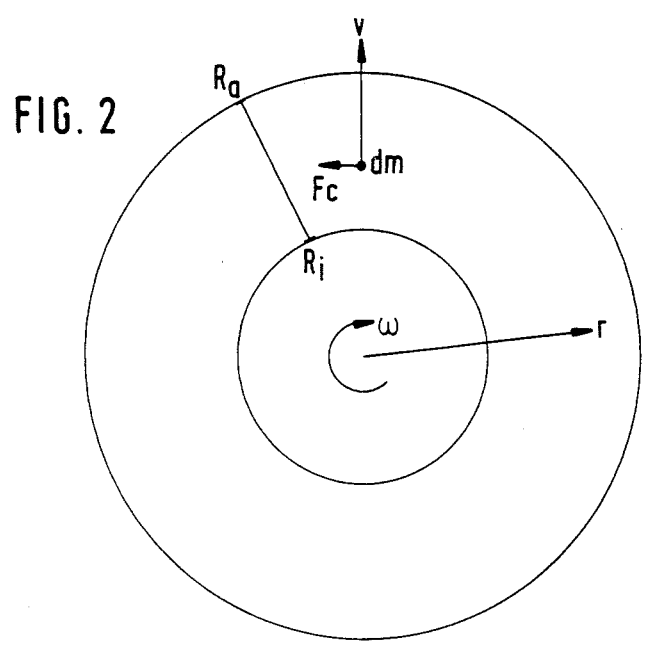

Referring first to FIG. 2, in order to demonstrate the dependence of the mass stream on the torque required for the drive of the impeller wheel, the following mathematical proof is offered.

In a moved (rotating) reference system (see FIG. 2) the Coriolis force $F_c$ acts on a mass particle dm. This force $F_c$ acts normally to the angular velocity $\omega$ and normally to the particle velocity V. The Coriolis force is the same for each radius and for the considered mass element dm $$dF_c = 2\omega \cdot v \cdot dm$$

The mass element dm can be calculated from the definition, that mass $m = \rho \cdot V$, $\rho$ being the density and V the volume:

$$dm = \rho \cdot dV.$$

the volume element dV being given by the cross-sectional surface A at a distance r from the point of rotation:

$$dV = A \cdot dr$$

and thus $$dm = A \cdot \rho \cdot dr$$

Introduced into the equation for the Coriolis force, the latter follows as:

$$dF_c = 2 \, w \cdot v \cdot A \cdot \rho \cdot dr$$

The product $A \cdot \rho \cdot V$ is equal to the mass stream per time through the considered volume element.

$$dm/dt = A \cdot \rho \sim v = \dot{m}$$

From this follows a relationship between the mass throughput m and Coriolis force $F_c$, the latter, because of its nature, being opposed to the rotation of the impeller wheel and therefore producing a braking torque.

$$dF_c = 2w \cdot \dot{m} \cdot dr$$

From this follows the torque $\tau_C = \vec{F}_c \times \vec{r}$ or, since $\vec{F}_c \perp \vec{r}$:

$$d\tau_c = r \, d F_c = 2\omega \cdot \dot{m} \cdot r \, dr$$

The braking torque $\tau_C$ is obtained from integration over the vane length as:

$$\tau_c = 2\omega \cdot \dot{m} \int r \, dr \rightarrow \tau_c = \dot{m} \cdot \omega (R_a^2 - R_i^2)$$

It follows from the foregoing that the torque required for the constant driving of the impeller wheel is exactly proportional to the mass throughput. This result has also been confirmed by practical experiments.

In the practical design of the measuring device it is essential to lead the material stream to the impeller wheel as uniformly as possible and without turbulence and also to discharge the stream from the latter without reaction effect.

Figure 1:
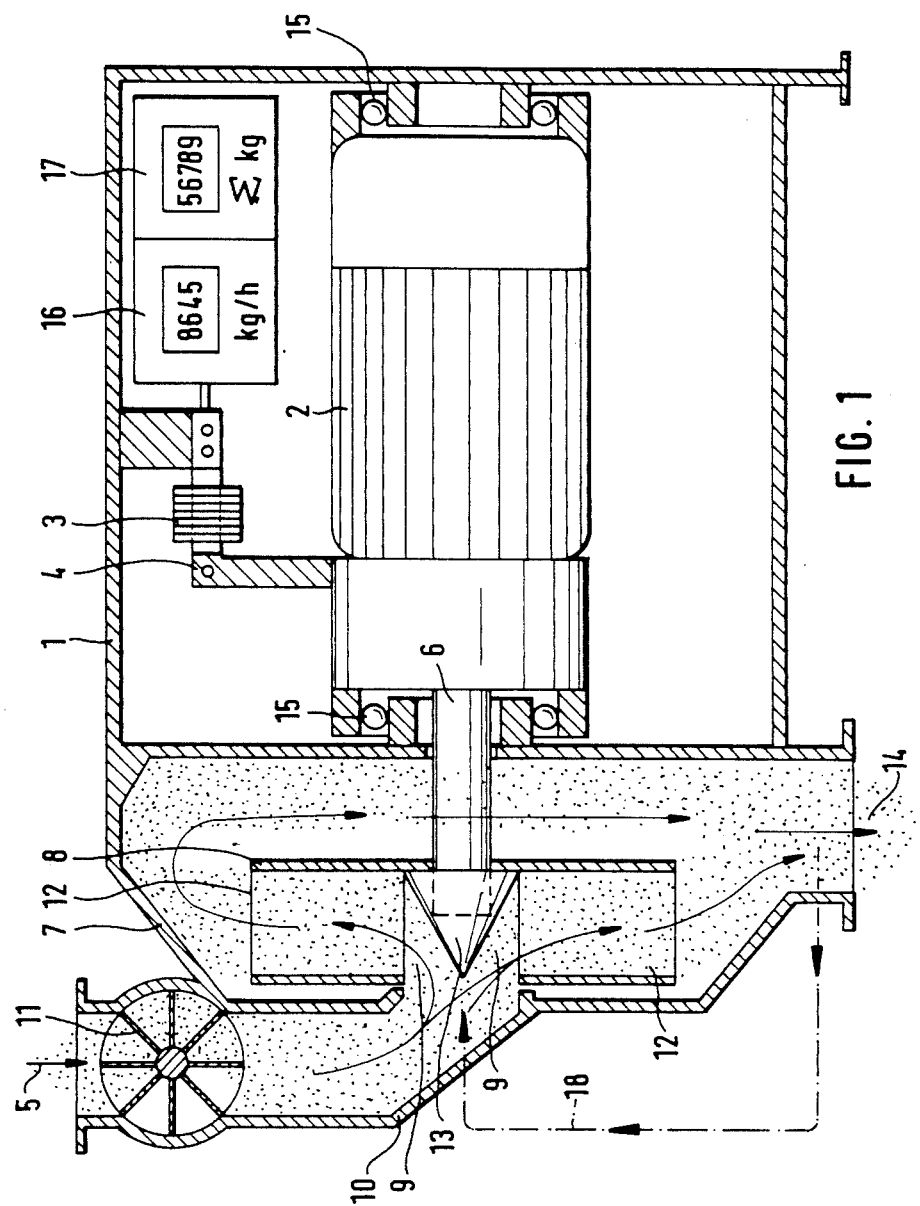

Turning now to FIG 1, an electro motor 2 supported for rocking movement in the housing 1 drives the impeller wheel 8 which is disposed in impeller wheel housing 7, by way of shaft 6. The electro motor is so controlled that it drives impeller wheel 8 at a constant rotary velocity independent of the load. In the axial supply range 9 of impeller wheel 8 there is provided adjacent to impeller wheel housing 7 a supply funnel 10 ahead of which a line wheel lock 11 is inserted. The guide vanes 12 of impeller wheel 8 are disposed outside of the central, axial supply range 9 so that the material stream arrives between the guide vanes 12 with as little turbulence as possible. The radial deflection is supported by guiding device 13 in the form of a cone 13.

The operation of the measuring device is as follows:

The material stream indicated by arrow 5, for example granular food such as wheat, is uniformly fed to the supply funnel 10 by way of line wheel lock 11 and it reaches the axial range 9 of the impeller wheel which rotates at a constant rotational velocity. A rotational velocity which results in a circumferential velocity of approximately 10 m/sec at the outer diameter of the impeller wheel, has proven useful for granular foods. The mass particles which in this manner are transported, largely free of turbulence, radially between the guide vanes 12, are flung off radially outwardly by means of the impeller wheel under conditions which are the same for each mass particle. The impeller wheel housing 7, has, in the range of the flinging off location, a housing wall inclined at about 45° to the impeller wheel axis so that the flung off particles are deflected into the rear discharge channel and are discharged through outlet 14. In this manner the impeller wheel is only insignificantly affected by bouncing off particles.

The driving torque to be imparted by motor 2 is dependent on the mass of the material stream to be conveyed through impeller wheel 8 at any time. Due to the fact that motor 2 is supported for rocking movement by way of linkage 4, with interposition of the energy storage element 3 disposed in parallel to the axis of rotation, and is rotationally guided merely at 15, the rotational displacement of the motor housing arising from the reaction torque is transferred to the energy storage element 3. The stored force is indicated by the indicating instrument 16 directly in kg/h as the momentary throughput power. The throughput power is accumulated with the aid of an integrating means and is transferred to the counter 17 and thus can be read therefrom.

Line wheel lock 11 prevents that an uncontrolled air current, accelerated by the impeller wheel, influences the measuring result. A worm tube could meet the same objective.

Compensation of the air currents which are taken along can also be effected by an air feedback line leading from the outlet space 14 to the supply range. To this connecting line the maximum air current which can be taken up by the impeller wheel is continuously conveyed and, in this manner the same air volume accelerated at all times. The measuring result therefore is not adulterated by the air.

The measuring device can also be installed in a position different from the horizontal position shown. Any desired angle including the vertical arrangement is possible. The only condition is that the central supply to the impeller wheel remains insured and that the discharge of the material from the impeller wheel housing can take place unimpeded.

Figure 3:
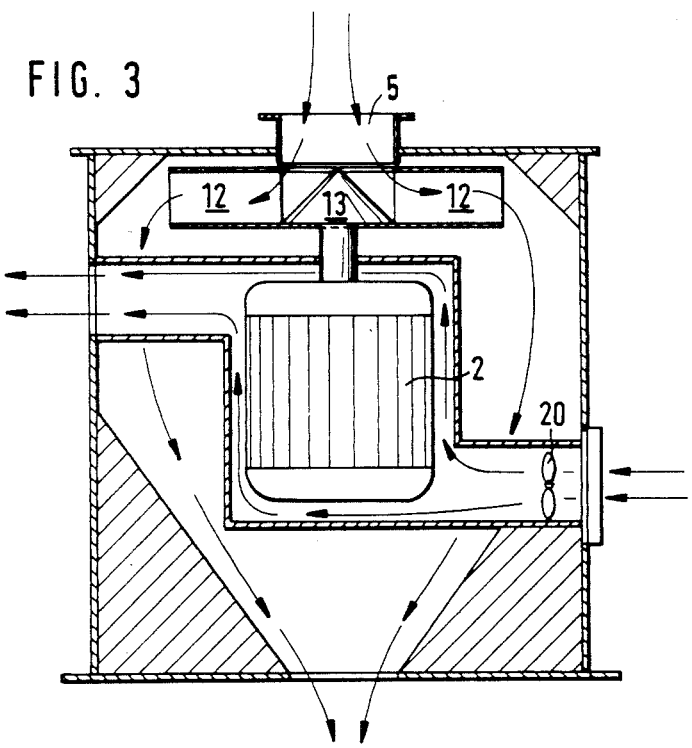

FIG. 3 shows such an arrangement in which drive motor 2 is vertically supported and is cooled by an air current produced by ventilator 20. The loose material stream 5 is deflected at cone 13 onto the guide vanes 12 of the impeller wheel.

The measuring device can also be designed as a dosing scale; to this end, a dosing element, for example the line wheel lock 11 is inserted ahead of the impeller wheel. By means of a regulating device the rotational velocity of the dosing element is adjusted so that the torque of the impeller wheel corresponds to a desired nominal value. This nominal torque is proportional to the desired material stream.

What is claimed is:

1. Measuring device for the continuous weight determination of material streams, particularly of loose materials such as granular foods or their grinding products, comprising an impeller wheel (8), a motor (2) driving said impeller wheel at a constant rotational velocity, and a charging device (10,11) supplying the material stream to said impeller wheel in the central range of said wheel, said wheel having guide vanes (12), and the resulting driving torque variations serving as a measure for the determination of the throughput volume, wherein the guide vanes (12) of the impeller wheel (8) which extend from the outer perimeter towards the center, terminate short of the central supply range.

2. Measuring device according to claim 1, wherein in the central supply range (9) of the impeller wheel (8) there is provided a guiding device (13) which deflects the material stream radially in the direction of the guide vanes (12).

3. Measuring device according to claim 2, wherein the guiding device (13) is cone shaped.

4. Measuring device according to claim 3, wherein the charging device includes a supply funnel (10) extending all the way to the central supply range (9), and a lock (11) upstream of said funnel.

5. Measuring device according to claim 4, wherein said lock is in the form of a line wheel (11) or a worm tube.

6. Measuring device according to claim 5, wherein there are provided means for adjusting the throughput volume of the lock (11) to a nominal torque of the impeller wheel (8), so that said lock serves as a dosing element.

7. Measuring device according to claim 1, wherein said impeller wheel is mounted in a housing (7) having a discharge space (14), and wherein said device also comprises an air feedback line (18) extending from said discharge space (14) to the supply range of the material stream.

8. Measuring device according to claim 7, wherein the impeller wheel housing (7) has a bouncing section which extends opposite the flinging off range of the impeller wheel (8) at an angle to the impeller wheel axis.

9. Measuring device according to claim 8, wherein the bouncing section extends at an angle of approximately 45° to the impeller wheel axis (6).

10. Measuring device according to claim 9, wherein there are provided means for supporting the motor (2) driving the impeller wheel (8) for rocking movement and a torque measuring device connected with said motor.

11. Measuring device according to claim 10, wherein said torque measuring device includes an energy storage means (3) extending in axial direction of the motor (2), and a linkage connecting said storage device with the motor housing.

12. Measuring device according to claim 11, wherein said torque measuring device also includes, in association with said energy storage device, an indicating instrument (16) calibrated in mass per unit of time, as well as a total mass counter (17).

* * * * *

UNITED STATES PATENT AND TRADEMARK OFFICE
CERTIFICATE OF CORRECTION

PATENT NO. : 4,574,896
DATED : Mar. 11, 1986
INVENTOR(S) : Claus FRIEDRICH

It is certified that error appears in the above-identified patent and that said Letters Patent are hereby corrected as shown below:

Col. 2, line 58  "bounding" should be -- bouncing --

" . 4, " 13 after "m", first occurence, insert $$-- \frac{R_a}{R_i} --$$

" . 6, " 11 "3" should be -- 1 --

Signed and Sealed this

Eighth Day of July 1986

[SEAL]

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,574,896
DATED : Mar. 11, 1986
INVENTOR(S) : Claus FRIEDRICH

It is certified that error appears in the above-identified patent and that said Letters Patent are hereby corrected as shown below:

Col. 2, line 58  "bounding" should be -- bouncing --

" . 4,  " 13  after "m", first occurence, insert $$-- \frac{R_a}{R_i} --$$

" . 6,  " 11  "3" should be -- 1 --

Signed and Sealed this

Twenty-sixth Day of August 1986

[SEAL]

Attest:

DONALD J. QUIGG

*Attesting Officer*  *Commissioner of Patents and Trademarks*